United States Patent
Cohen et al.

(10) Patent No.: US 9,518,734 B2
(45) Date of Patent: Dec. 13, 2016

(54) FLUID DISTRIBUTION AND MIXING GRID FOR MIXING GASES

(71) Applicant: ALSTOM Technology Ltd, Baden (CH)

(72) Inventors: Mitchell B. Cohen, West Hartford, CT (US); Yen-Ming Chen, Broad Brook, CT (US); Armand A. Levasseur, Windsor Locks, CT (US)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 658 days.

(21) Appl. No.: 13/751,399

(22) Filed: Jan. 28, 2013

(65) Prior Publication Data

US 2014/0208994 A1 Jul. 31, 2014

(51) Int. Cl.
| | |
|---|---|
| *F23J 15/02* | (2006.01) |
| *B01F 5/04* | (2006.01) |
| *B01F 3/02* | (2006.01) |
| *F23L 7/00* | (2006.01) |
| *F23C 9/00* | (2006.01) |

(52) U.S. Cl.
CPC ............... *F23J 15/02* (2013.01); *B01F 3/02* (2013.01); *B01F 5/0456* (2013.01); *B01F 5/0463* (2013.01); *F23C 9/00* (2013.01); *F23L 7/007* (2013.01); *F23J 15/022* (2013.01); *F23L 2900/07001* (2013.01); *Y02E 20/322* (2013.01); *Y02E 20/344* (2013.01)

(58) Field of Classification Search
CPC ...... Y02E 20/322; Y02E 20/344; F23L 7/007; F23L 2900/07001; F23L 2900/07002; F23L 2900/07005; F23D 14/32; F23C 9/00
See application file for complete search history.

(56) References Cited

U.S. PATENT DOCUMENTS

| | | | |
|---|---|---|---|
| 5,988,115 | A | 11/1999 | Anderson et al. |
| 5,997,822 | A | 12/1999 | Komai et al. |
| 2008/0006188 | A1 | 1/2008 | Wu et al. |
| 2008/0034658 | A1 | 2/2008 | Heiser et al. |

(Continued)

FOREIGN PATENT DOCUMENTS

| | | |
|---|---|---|
| CH | 701 602 A2 | 2/2011 |
| CN | 101994572 A | 3/2011 |

(Continued)

OTHER PUBLICATIONS

First Office Action issued by the State Intellectual Property Office, P.R. China for Chinese Patent Application No. 201410038875.0 dated Oct. 30, 2015.

(Continued)

*Primary Examiner* — David J Laux
(74) *Attorney, Agent, or Firm* — GE Global Patent Operation; Stephen G. Midgley (57) ABSTRACT

A grid for distributing and mixing fluids in a duct includes a plurality of lances arranged in a first plane and configured to be positioned transverse to a direction of a first fluid flowing outside of the lances and within a predetermined flow area. Each of the plurality of lances has at least one first inlet and a plurality of outlet nozzles. One or more of the outlet nozzles is directed generally in the flow direction of the first fluid outside of the lances, and is configured to discharge a second fluid therefrom.

13 Claims, 7 Drawing Sheets

(56) References Cited

U.S. PATENT DOCUMENTS

| | | |
|---|---|---|
| 2008/0066443 A1 | 3/2008 | Frutschi et al. |
| 2008/0070090 A1 | 3/2008 | Yoshizumi et al. |
| 2008/0090194 A1 | 4/2008 | Laux et al. |
| 2008/0184880 A1 | 8/2008 | Fan et al. |
| 2008/0196583 A1 | 8/2008 | Ha |
| 2008/0196584 A1 | 8/2008 | Ha |
| 2008/0196585 A1 | 8/2008 | Ha |
| 2008/0196587 A1 | 8/2008 | Ha |
| 2008/0245349 A1 | 10/2008 | Mitani et al. |
| 2009/0139497 A1 | 6/2009 | Shi et al. |
| 2009/0178408 A1 | 7/2009 | Brugerolle et al. |
| 2009/0205311 A1 | 8/2009 | Bulman et al. |
| 2009/0255450 A1 | 10/2009 | Stone et al. |
| 2009/0297994 A1 | 12/2009 | Borders et al. |
| 2010/0012080 A1 | 1/2010 | Hokkanen et al. |
| 2010/0024381 A1 | 2/2010 | Ackermann et al. |
| 2010/0031859 A1 | 2/2010 | Bruun et al. |
| 2010/0071380 A1 | 3/2010 | Buecker et al. |
| 2010/0077941 A1* | 4/2010 | D'Agostini ............ F23C 9/003 110/188 |
| 2010/0107994 A1 | 5/2010 | Moriarty et al. |
| 2010/0111795 A1 | 5/2010 | Cremona et al. |
| 2010/0126876 A1 | 5/2010 | Peters |
| 2010/0154429 A1 | 6/2010 | Peters |
| 2010/0159410 A1 | 6/2010 | Hwang |
| 2010/0167223 A1 | 7/2010 | Hwang |
| 2010/0224477 A1 | 9/2010 | Peters |
| 2010/0239988 A1 | 9/2010 | Simpson |
| 2010/0263377 A1 | 10/2010 | Meulenberg et al. |
| 2010/0275777 A1 | 11/2010 | Hasse et al. |
| 2010/0314878 A1 | 12/2010 | Dewitt |
| 2011/0024283 A1 | 2/2011 | Peters |
| 2011/0067652 A1 | 3/2011 | Bishop |
| 2011/0073051 A1* | 3/2011 | Taniguchi ............ F23C 9/003 122/4 D |
| 2011/0123938 A1 | 5/2011 | Laux |
| 2011/0132737 A1 | 6/2011 | Jadhav |
| 2011/0207336 A1 | 8/2011 | Kobayashi |
| 2011/0250551 A1 | 10/2011 | McDonald |
| 2011/0294077 A1 | 12/2011 | Seltzer et al. |
| 2011/0319659 A1 | 12/2011 | Yoshikawa et al. |
| 2012/0042810 A1 | 2/2012 | Niass |
| 2012/0056431 A1 | 3/2012 | Bland et al. |
| 2012/0060728 A1 | 3/2012 | Nazarko et al. |
| 2012/0067048 A1 | 3/2012 | Mishima et al. |
| 2012/0067326 A1 | 3/2012 | Aledavood |
| 2012/0070788 A1 | 3/2012 | Noh et al. |
| 2012/0090352 A1 | 4/2012 | Brun et al. |
| 2012/0111246 A1 | 5/2012 | Kobayashi et al. |
| 2012/0129112 A1* | 5/2012 | Cegarra Cruz ......... F01K 17/06 431/11 |
| 2012/0129113 A1 | 5/2012 | Handagama et al. |
| 2012/0137736 A1 | 6/2012 | Sakamoto et al. |
| 2012/0137737 A1 | 6/2012 | Sakamoto et al. |
| 2012/0159994 A1 | 6/2012 | Sakamoto et al. |
| 2012/0189522 A1 | 7/2012 | Fan et al. |
| 2012/0214115 A1 | 8/2012 | Cameron et al. |
| 2012/0216571 A1 | 8/2012 | Sakamoto et al. |
| 2012/0227644 A1* | 9/2012 | Uchida ................. B01F 3/026 110/205 |
| 2012/0272626 A1* | 11/2012 | Mitsui ................ B01D 53/343 55/315.2 |
| 2012/0301835 A1 | 11/2012 | Adendorff et al. |

FOREIGN PATENT DOCUMENTS

| | | |
|---|---|---|
| DE | 10 2004 052827 A1 | 5/2006 |
| EP | 0 526 392 A1 | 2/1993 |
| EP | 2 487 439 A1 | 8/2012 |
| JP | S60 132624 A | 7/1985 |
| WO | 2007/028689 A1 | 3/2007 |
| WO | 2011/010160 A1 | 1/2011 |
| WO | 2012/042892 A1 | 4/2012 |

OTHER PUBLICATIONS

European Search Report for EP Application No. 15163728.7, dated Sep. 4, 2015.

* cited by examiner

FLUID DISTRIBUTION AND MIXING GRID FOR MIXING GASES

GOVERNMENT RIGHTS

This invention was made with government support under U.S. Contract No. DE-NT0005290. The U.S. government holds certain rights in this invention.

TECHNICAL FIELD

The present disclosure is generally directed to a distribution and mixing grid, and in particular to an oxygen distribution and mixing grid for use in an oxy-combustion system for providing a uniform mixing of oxygen in a flue gas duct.

BACKGROUND

Steam generators, particularly those of the coal fired type, can generate harmful emissions. Recent efforts have focused on oxygen firing (e.g., oxy-combustion) which injects oxygen into a duct that transports flue gas into a fuel supply system (e.g., coal pulverizer system) and/or the steam generator. The oxygen can be supplied from an air separation unit. Due to the elimination of the inherent nitrogen that occurs with air firing, oxygen firing results in an essentially pure carbon dioxide product gas which can be more efficiently sequestered. Most oxygen fired steam generators utilize significant flue gas recirculation in order to maintain the required mass flow through the steam generator to support the heat transfer processes. Gas recirculation at high rates adds considerable cost, complexity, and increases the need for auxiliary power.

Typically oxygen from the air separation unit is mixed with the recycled flue gas streams forming an oxidant stream before entering the steam generator. There may be some limits placed on the concentration of oxygen in the oxidant stream. For example, the primary oxidant stream which transports pulverized fuel to the steam generator may be limited to about the 21% oxygen content of air to avoid problems with premature combustion of the fuel. Also oxygen contents much above 21% may require that ducts and other components be made of more expensive, higher grade materials suitable for the higher oxygen content. The duct and component limit is 23.5% for temperatures of 200-900° F., which the oxidant typically is subject to. Therefore, very good mixing of oxygen in the recycled flue gas stream is important.

SUMMARY

According to aspects illustrated herein there is provided a distribution and mixing grid for mixing fluids, for example, mixing oxygen in a stream of flue gas, in a duct includes a plurality of lances arranged in a first plane and configured to be positioned transverse (e.g., perpendicular) to a flow direction of a first fluid, for example, flue gas, outside of the lances and within a predetermined flow area. Each of the plurality of lances has at least one inlet and a plurality of outlet nozzles. One or more of the outlet nozzles is directed generally in the flow direction of the first fluid outside of the lances, and is configured to discharge a second fluid (e.g., oxygen) therefrom.

According to further aspects illustrated herein, there is disclosed an oxy-combustion system including a furnace defining an interior combustion area, an oxygen supply system and a fuel supply system. The fuel supply system includes a primary flue gas inlet and a fuel outlet. The oxy-combustion system includes one or more flue gas processing systems (e.g., an air preheater, a particulate removal system, a sulfur removal system, a flue gas cooler and or a carbon dioxide removal system) positioned downstream of and in communication with the furnace. The oxy-combustion system includes a primary gas system defining a primary flue gas outlet. The primary gas system is in communication with one or more of the flue gas processing systems and/or the primary flue gas outlet is in fluid communication with the fuel inlet. The oxy-combustion system includes a secondary gas system in communication with one or more of the flue gas processing systems and the furnace. One or more of the oxygen discharge lines are in communication with the primary gas system and/or the secondary gas system. The oxy-combustion system includes a grid positioned in a duct of the primary gas system and/or the secondary gas system. The grid includes a plurality of lances arranged in a first plane and positioned transverse (e.g., perpendicular) to a flow direction of a flue gas outside of the lances and within a predetermined flow area. Each of the plurality of lances has at least one oxygen inlet and a plurality of outlet nozzles. The oxygen inlet is in communication with the oxygen supply system. One or more of the outlet nozzles is directed generally in the direction of the flue gas flowing outside of the lances, and are configured to discharge oxygen therefrom.

The above described and other features are exemplified by the following figures and in the detailed description

BRIEF DESCRIPTION OF THE DRAWINGS

Referring now to the figures, which are exemplary embodiments, and wherein the like elements are numbered alike.

DETAILED DESCRIPTION

Figure 1:
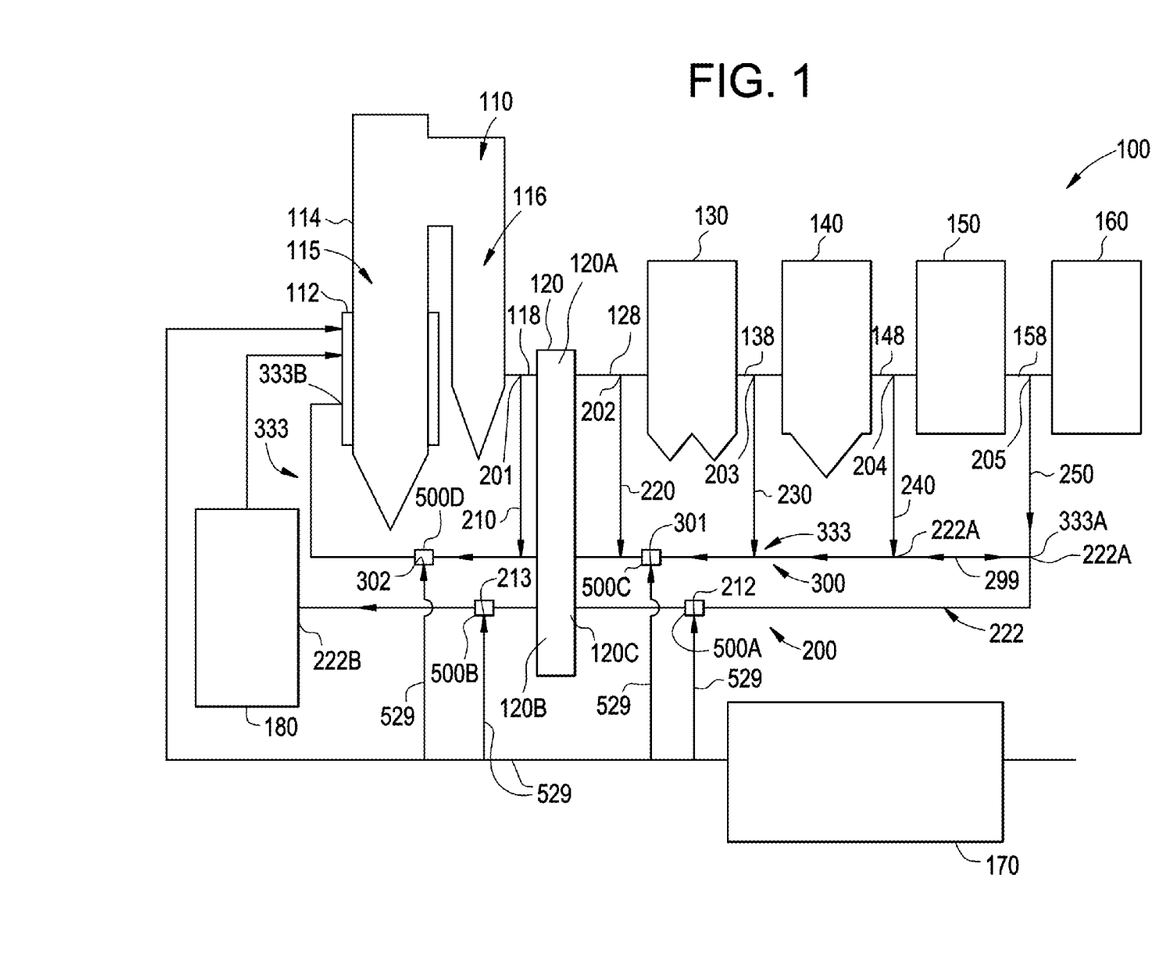
FIG. 1 is a schematic drawing of the oxy-combustion disclosed herein.

Referring to FIG. 1 an oxy-combustion system 100 includes an oxy-combustion furnace 110, for example a tangential fired furnace. The oxy-combustion furnace 110 includes a duct system 112, for example, a windbox positioned at the corners of a combustion portion 114 of the furnace and in communication with an interior combustion area 115 of the oxy-combustion furnace 110. The oxy-combustion furnace 110 includes an exhaust section 116 positioned downstream of the interior combustion area 115, for exhausting flue gas from the oxy-combustion furnace 110. The oxy-combustion furnace 110 includes an air pre-heater 120, for example a regenerative air pre-heater positioned downstream of and in communication with the exhaust section 116 via an outlet duct 118. The air preheater 120 defines a first side 120A, for example a flue gas cooling side, separated from a second and third side 120B and 120C, for example a flue gas heating side. The oxy-combustion furnace 110 includes a particulate removal system 130, for example an electro-static precipitator or baghouse, positioned downstream of the air pre-heater. The particulate removal system 130 is in communication with the air pre-heater 120 via a gas duct 128. The oxy-combustion furnace 110 includes a sulfur removal system 140, for example a wet or dry flue gas desulfurization system, positioned downstream of and in communication with the particulate removal system 130 via a gas duct 138. The oxy-combustion furnace 110 includes a flue gas cooler 150, for example a counter current water spray heat exchanger, positioned downstream of and in fluid communication with the sulfur removal system 140 via gas duct 148. The oxy-combustion furnace 110 includes a gas processing system 160, for example a carbon dioxide removal and sequestration system, positioned downstream of and in fluid communication with the flue gas cooler 150 via a gas duct 158. The oxy-combustion furnace 110 includes an air separation unit, for example an oxygen supply system 170 in communication with a fuel supply system 180, for example a coal pulverizer and is in communication with the furnace oxy-combustion furnace 110, as described herein.

Referring to FIG. 1, the oxy-combustion furnace 110 includes a primary gas system 200 which provides a mixture of flue gas and oxygen to the fuel supply system 180 for conveying the fuel into the interior combustion area 115 of the oxy-combustion furnace 110, as described herein. The primary gas system 200 includes a primary transport duct 222 extending from a point 222A upstream of the flue gas heating side 120B of the air preheater 120, to another point 222AA upstream of the flue gas heating side 120B of the air preheater 120 and to the fuel supply system 180 at a point 222B. The primary transport duct 222 is configured for receiving and transporting a mixture of oxygen and flue gas to the fuel supply system 180, as described herein.

Still, referring to FIG. 1, the oxy-combustion furnace 110 includes a secondary gas system 300 which provides a mixture of flue gas and oxygen to the into the interior combustion area 115 of the oxy-combustion furnace 110, as described herein. The secondary gas system 300 includes a secondary transport duct 333 extending from a point 333A upstream of the flue gas heating side 120B of the air preheater 120 to a point 333B in the windbox 112. The secondary transport duct 333 is configured for receiving and transporting a mixture of oxygen and flue gas to the interior combustion area 115, as described herein.

The primary gas system 200 is configured to selectively receive flue gas from the oxy-combustion system 100 via a plurality of points, for example, 1) from a first point 201 located in the outlet duct 118 between the oxy-combustion furnace 110 and the air pre-heater 120, to the primary transport duct 222, via a tie line 210, the secondary transport duct 333 and another tie line 299; 2) from a second point 202 located in the gas duct 128 between the air pre-heater 120 and the particulate removal system 130 to the primary transport duct 222, via a tie line 220, the secondary transport duct 333 and the tie line 299; 3) a third point 203 located in the gas duct 138 between the particulate removal system 130 and the sulfur removal system 140 to the primary transport duct 222, via a tie line 230, the secondary transport duct 333 and the tie line 299; 4) a fourth point 204 located in the gas duct 148 between the sulfur removal system 140 and the flue gas cooler 150 to the primary transport duct 222, via a tie line 240, the secondary transport duct 333 and the tie line 299; and/or 5) a fifth point 205 located in the gas duct 158 between the flue gas cooler 150 and the gas processing system 160 to the primary transport duct 222, via a tie line 150.

Figure 2:
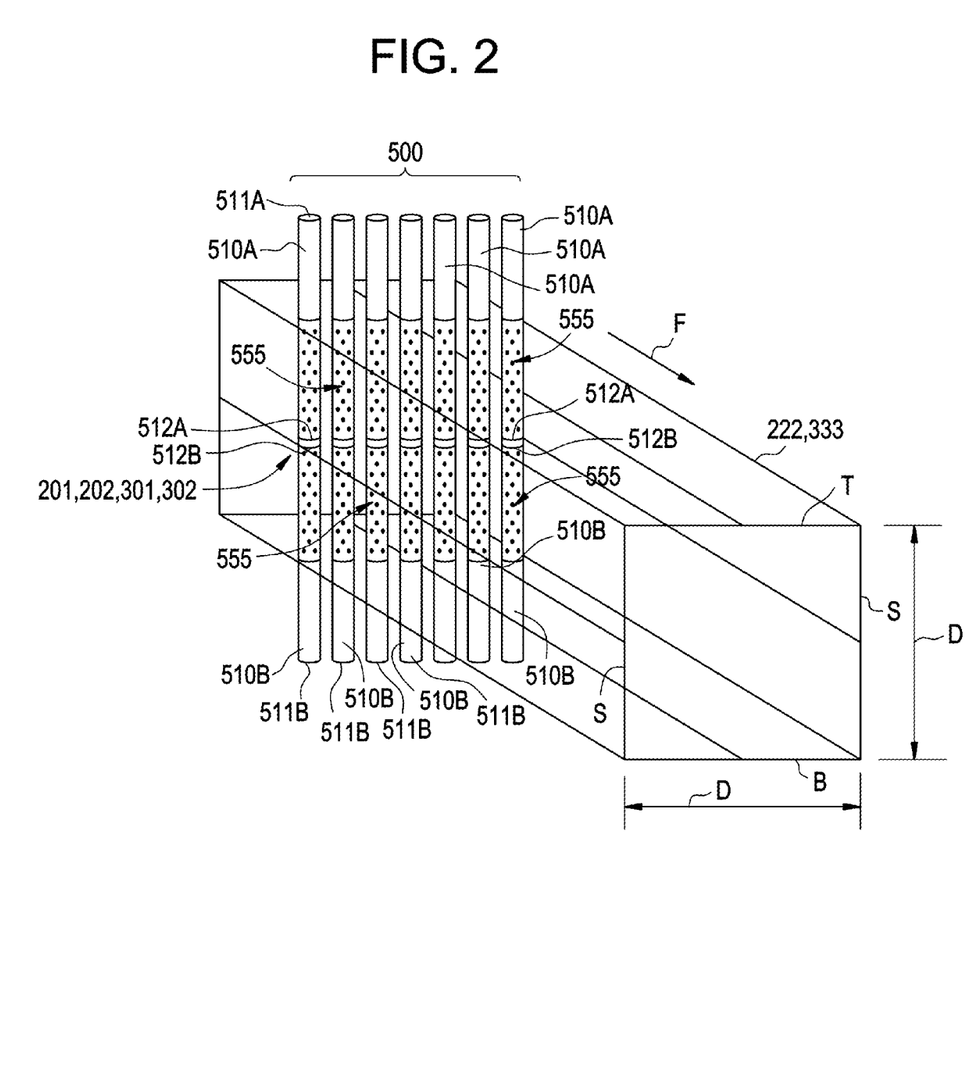
FIG. 2 is a perspective view of the fluid distribution and mixing grid disclosed herein, positioned in a duct.
Figure 6:
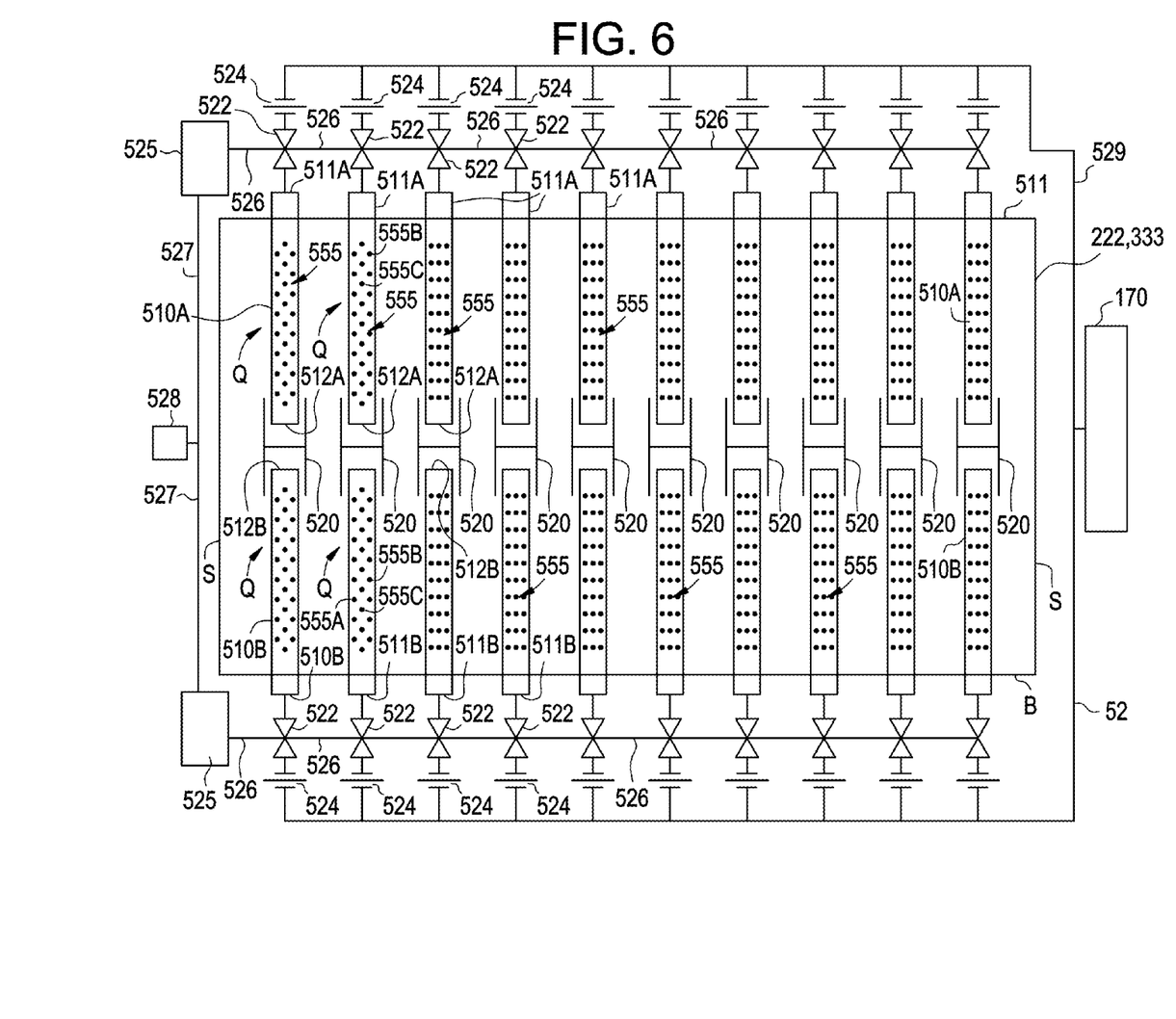
FIG. 6 is a front elevation view of the fluid distribution and mixing grid of FIG. 2.

Still referring to FIG. 1, the primary transport duct 222 includes a plurality of injection points, for example a first injection point 212 located upstream of the flue gas heating side 120B of the air pre-heater 120 and a second injection point 213 located downstream of the flue gas heating side 120B of the air pre-heater 120. A fluid distribution and mixing grid 500A, for example the fluid distribution and mixing grid 500 shown in FIGS. 2 and 6 is positioned in the primary transport duct 222 at the first injection point 212. The fluid distribution and mixing grid 500A is positioned upstream of the flue gas heating side 120B of the air preheater 120. In one embodiment, a fluid distribution and mixing grid 500B, for example the fluid distribution and mixing grid 500 shown in FIGS. 2 and 6 is positioned in the primary transport duct 222 at the second injection point 213. The fluid distribution and mixing grid 500B is positioned downstream of the flue gas heating side 120B of the air preheater 120.

The secondary gas system 300 is configured to selectively receive flue gas from the oxy-combustion system 100 via a plurality of points, for example, 1) from a first point 201 located in the outlet duct 118 between the oxy-combustion furnace 110 and the air pre-heater 120 to the secondary transport duct 333, via the tie line 210; 2) from a second point 202 located in the gas duct 128 between the air pre-heater 120 and the particulate removal system 130 to the secondary transport duct 333, via the tie line 220; 3) a third point 203 located in the gas duct 138 between the particulate removal system 130 and the sulfur removal system 140 to the secondary transport duct 333, via the tie line 230; 4) a fourth point 204 located in the gas duct 148 between the sulfur removal system 140 and the flue gas cooler 150 to the secondary transport duct 333, via the tie line 240; and/or 5) a fifth point 205 located in the gas duct 158 between the flue gas cooler 150 and the gas processing system 160 via tie line 250.

Still referring to FIG. 1, the secondary transport duct 333 includes a plurality of injection ports, for example a first injection point 301 located upstream of the flue gas heating side 120B of the air pre-heater 120 and a second injection point 302 located downstream of the flue gas heating side 120B of the air pre-heater 120. A fluid distribution and mixing grid 500C, for example the fluid distribution and mixing grid 500 shown in FIGS. 2 and 6 is positioned in the secondary transport duct 333 at the first injection point 301. The fluid distribution and mixing grid 500C is positioned upstream of the flue gas heating side 120B of the air preheater 120. In one embodiment, a fluid distribution and mixing grid 500D, for example the fluid distribution and mixing grid 500 shown in FIGS. 2 and 6 is positioned in the secondary transport duct 333 at the second injection point 302. The fluid distribution and mixing grid 500D is positioned downstream of the flue gas heating side 120B of the air preheater 120.

Referring to FIGS. 2 and 6, the fluid distribution and mixing grid 500 includes a plurality of lances 510A and 510B, for example, seven upper lances 510A and seven bottom lances 510B (FIG. 2) or ten upper lances 510A and ten bottom lances 510B (FIG. 6), positioned in the primary transport duct 222 and/or the secondary transport duct 333. While seven and/or ten upper lances 510A and/or bottom lances 510B are shown and described, the present disclosure is not limited in this regard as any number of lances may be employed and installed in configurations other than upper and lower, including but not limited to lances mounted through sides S of any ducts.

Each of the upper lances 510A and the bottom lances 510B have a plurality of nozzles formed therein for distribution of a gas, such as, oxygen therefrom, as described below. As shown best in FIG. 2 the primary transport duct 222 and/or the secondary transport duct 333 have a square cross section with sides having a length of D and a flow area defined by $D^2$. Although the cross section of the primary transport duct 222 and/or the secondary transport duct 333 are shown and described as being square, the present disclosure is not limited in this regard as any suitable geometric cross section including but not limited to rectangular and circular cross sections may be employed. The upper lances 510A and the bottom lances 510B are arranged in a common plane in the flow area and are substantially parallel to one another. The common plane is generally transverse to, for example perpendicular to, a direction F of flow of flue gas in the primary transport duct 222 and/or the secondary transport duct 333. While the common plane is described as being perpendicular to the direction f of flow flue gas, the present disclosure is not limited in this regard as other configurations may be employed, including but not limited to any angle relative to the direction F and in any orientation including horizontal and diagonal. The upper lances 510A penetrate a top portion T of the primary transport duct 222 and/or the secondary transport duct 333. The bottom lances 510B penetrate a bottom portion B of the primary transport duct 222 and/or the secondary transport duct 333. The upper lances 510A define an inlet 511A and a closed end 512A. The bottom lances 510B define an inlet 511B and a closed end 512B. The closed ends 512A of the upper lances are spaced apart from the respective closed end 512B of the bottom lances 510B. As shown in FIG. 6, a sleeve 520 is positioned around each adjacent pair of the closed ends 512A and the closed ends 512B, for support purposes. Each pair of the closed ends 510A and the closed ends 501B are moveably positioned in the respective sleeve 520 to allow for thermal expansion and contraction and vibratory movement of the upper lances 510A and the bottom lances 510B.

As shown in FIG. 6, two flow control devices, for example a control valve 522 and an orifice 524 are positioned upstream of each of the inlets 511A and 511B for controlling the flow of a gas such as oxygen into the upper lances 510A and the bottom lances 510B. Each of the control valves 522 is in communication with a control system such as manual independent adjustment of the control valves 522 and/or a controller 525, for example two controllers 525 are shown, via a line 526. The controllers 525 are in communication with a computer processor 528 via a line 527 for, controlling the control valves 522 and the flow of gas to the upper and lower lances 510A and 510B, respectively. The control system, adjusts the control valves 522 for modulating the flow of gas to each of the lances 510A and 510B.

As shown in FIGS. 1 and 6, the oxygen supply system 170 is in communication with each of the distribution and mixing grids 500, (e.g., 500A, 500B, 500C and 500D). As best shown in FIG. 6, the oxygen supply system 170 is in communication with each of the inlets 511A and 511B of the upper lances 510A and the bottom lances 510B, respectively, via the respective orifices 524 and the respective control valves 522. While the oxygen supply system 170 is shown and described as being in communication with each of the inlets 511A and 511B of the upper lances 510A and the bottom lances 510B, the present disclosure is not limited in this regard as one or more fluids other than or in addition to oxygen may be supplied to one or more of the upper lances 510A and the bottom lances 510B, including but not limited to flue gas, air, water, steam and sorbents.

Figure 4:
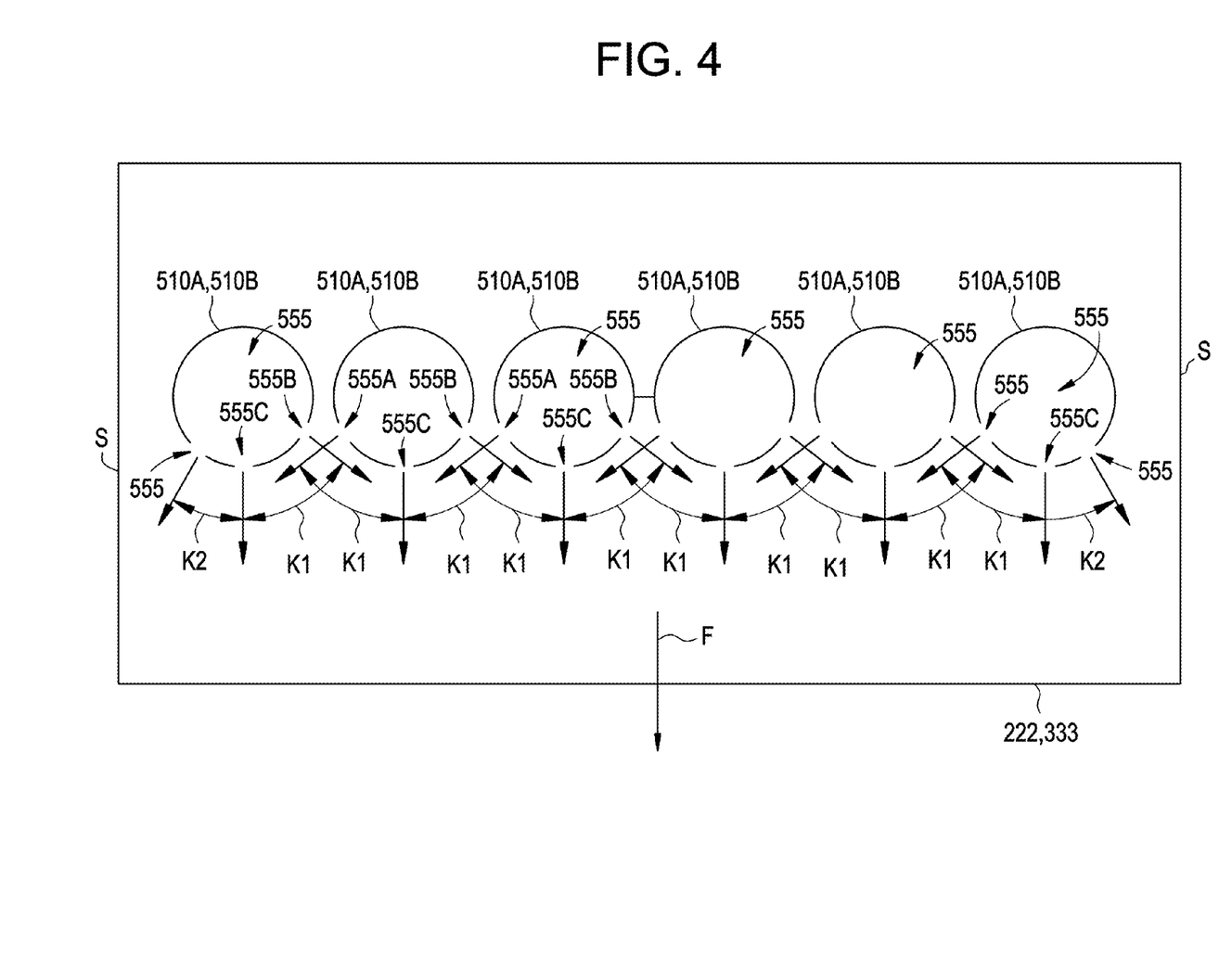
FIG. 4 is a top view of lances of the fluid distribution and mixing grid of FIG. 2.
Figure 5:
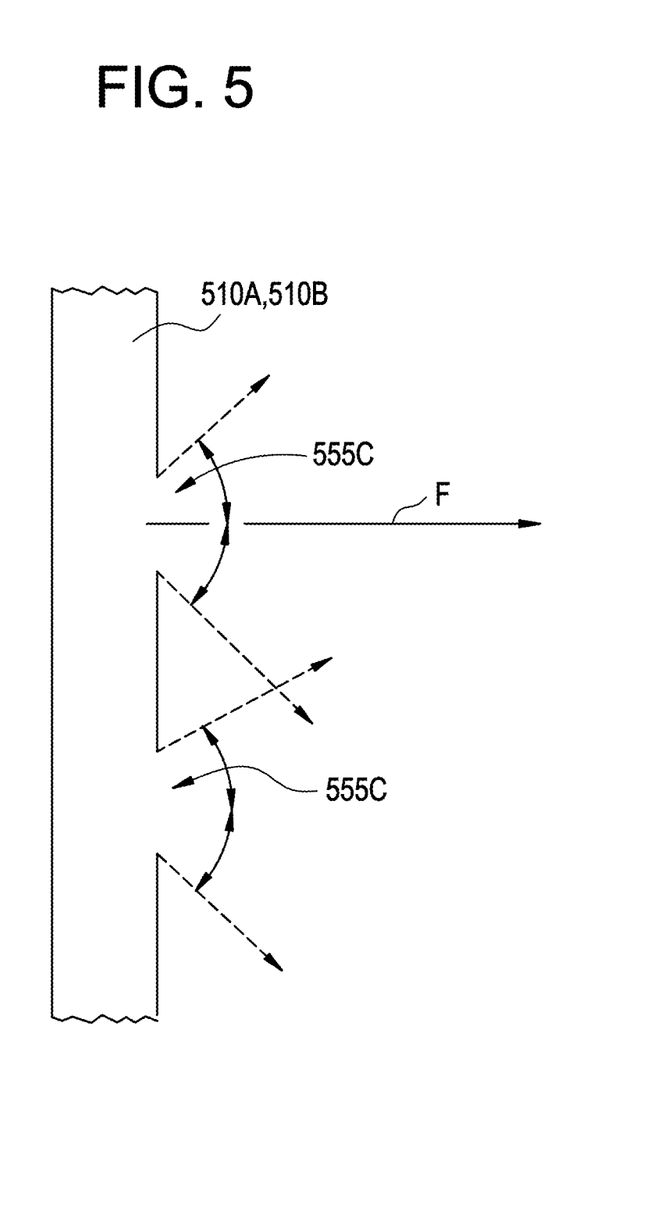
FIG. 5 is a side elevation view of a portion of one of the lances of FIG. 2.

As shown in FIGS. 2 and 4-6, each of the upper lances 510A and the bottom lances 510B includes a plurality of nozzles 555 formed therein. In one embodiment, the nozzles 555 are holes drilled through a surface of the upper lance 510A and the bottom lances 510B. As best shown in FIGS. 4 and 5, there are three nozzles 555 formed in the upper lances 510A and the bottom lances 510B, at each of a plurality of common axial locations. For example, the upper lances 510A and the bottom lances 510B include a central nozzle 555C aligned coaxially with the direction F of the flue gas flow through the primary transport duct 222 and/or the secondary transport duct 333. The upper lances 510A and the bottom lances 510B include a first side nozzle 555A and a second side nozzle 555B positioned on opposing sides of the central nozzle 555C and at an angle K1 therefrom. In one embodiment, the angle K1 is about 45 degrees, plus or minus fifteen degrees (i.e., about 30 to 60 degrees). The upper lances 510A and bottom lances 510B adjacent to the side walls S have one of the side nozzles 555T positioned at an angle K2 from the central nozzle 555C and spaced apart therefrom by an angle K2. In one embodiment, the angle K2 is about 22.5 degrees, plus or minus ten degrees (i.e., about 12.5 to about 32.5 degrees). While the groups of three of the side nozzles 555A and 555B and the central nozzle 555C are shown and described as being in a common axial plane, the present disclosure is not limited in this regard as the side nozzles 555A and 555B may be staggered axially from the central nozzle 555C as shown for example in two of the lances 510A and two of the lances 510B, in FIG. 6 as referred to by the arrow Q.

The inventors used computational fluid dynamic (CFD) modeling and analysis to determine the quality of the mixing of oxygen and flue gas in ducts using many configurations of one or more static mixing grids modeled in one or more locations (e.g., multiple rows) in various flue duct configurations. While the CFD modeling was performed to quantify the mixing of oxygen in flue gas, the CFD modeling results are also applicable to the mixing of other fluids, gases, liquids, particulate solids and combinations thereof, such as but not limited to $SO_2$, $SO_3$ and mercury.

After modeling and analyzing CFD results for a significant number of configurations, the inventors surprisingly determined that the grid 500 demonstrated superior mixing compared to other configurations. For example, the CFD results for the grid 500 were unexpected because one skilled in the relevant art would have be discouraged from positioning a plurality of the lances 510A and 510B in a single plane, for example transverse to (e.g., perpendicular) to the flue gas flowing there around, because of the increase in pressure drop of the flue gas in the duct caused by the obstruction of the grid 500.

Figure 3:
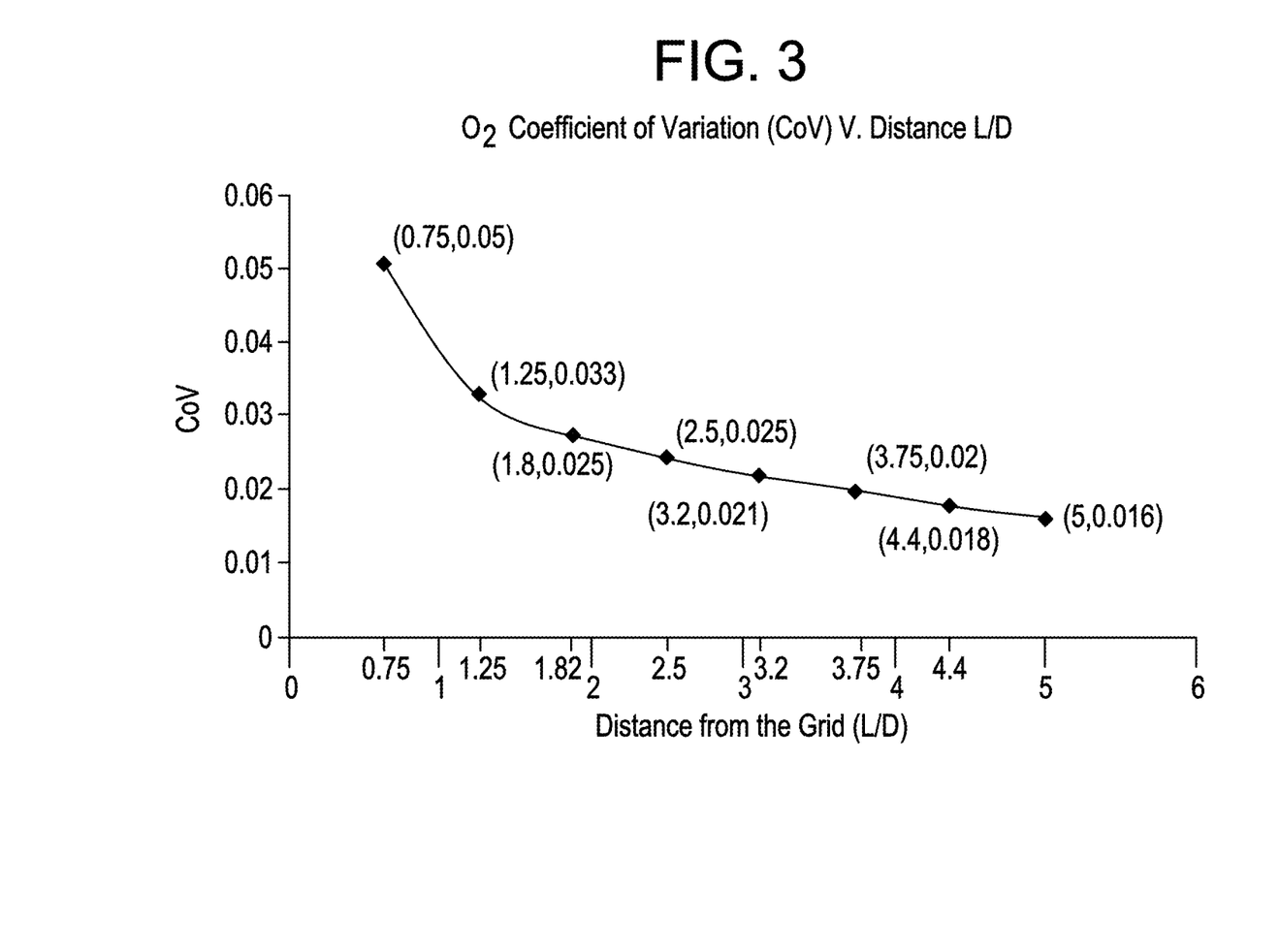
FIG. 3 is a graph of coefficient of variation as a function of distance from the fluid distribution and mixing grid of FIG. 2.

Mixing results for the grid 500 are presented as a coefficient of variation (CoV), which is a measure of the mixed gas homogeneity and equal to the standard deviation divided by the normalized average oxygen concentration at a particular location in the duct. CoV was determined for various lengths downstream of the grid 500. Length was normalized and presented in terms of diameters of duct, for example the duct equivalent diameters (L/D). A CoV of 0.05 is considered good mixing and 0.02 is considered excellent mixing. The results of the CFD modeling are shown in FIG. 3, in a graph of CoV versus L/D. FIG. 3 demonstrates that a CoV of 0.05 is reached at point less than one L/D (duct diameter) downstream of the grid 500; and that a CoV of 0.02 is reached at a point less than four L/D downstream from the grid 500. In particular, the graph of FIG. 3 yielded the following data points.

TABLE 1

| CoV | L/D |
|---|---|
| 0.05 | 0.75 |
| 0.033 | 1.25 |
| 0.028 | 1.8 |
| 0.021 | 3.2 |
| 0.02 | 3.75 |
| 0.018 | 4.4 |
| 0.016 | 5.0 |

Figure 7A:
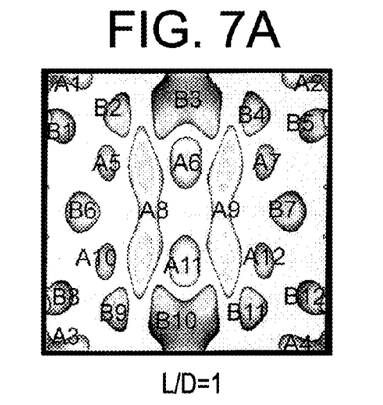
FIG. 7A is graph showing oxygen concentration in the recirculated flue gas at one duct diameter downstream of the fluid distribution and mixing grid of FIG. 2.
Figure 7B:
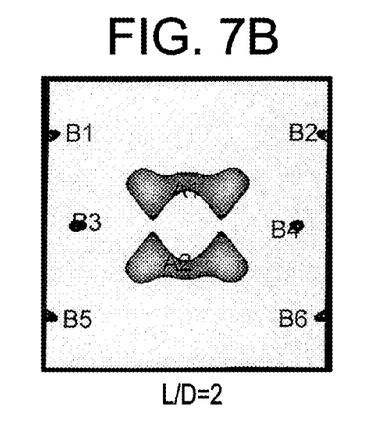
FIG. 7B is graph showing oxygen concentration in the recirculated flue gas at two duct diameters downstream of the fluid distribution and mixing grid of FIG. 2.
Figure 7C:
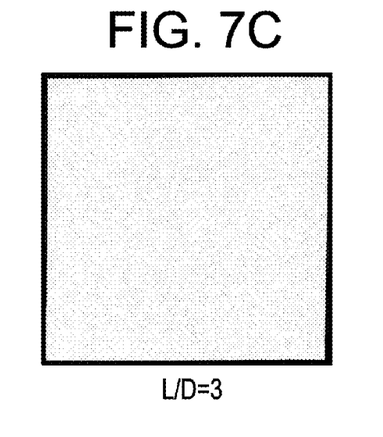
FIG. 7C is graph showing oxygen concentration in the recirculated flue gas at three duct diameters downstream of the fluid distribution and mixing grid of FIG. 2.

FIGS. 7A, 7B and 7C graphically illustrate and Table 2 summarizes the mixing performance of the grid 500 obtained from the CFD modeling, at three distances from the grid 500, namely L/D 1, 2 and 3, respectively, for the mixing of oxygen gas injected via the grid 500 into a flue gas stream. While the CFD modeling is described as being for the mixing of oxygen injected into flue gas, the modeling results also apply to the mixing of other fluids such as gases and liquids into one another, as well as to gasses and fluids having particulate matter entrained therein.

As shown in FIG. 7A, at a distance L/D of 1 from the grid 500, there are four corner regions A1-A4 of low oxygen concentration, namely less than 21% (weight percent) oxygen in the flue gas stream and eight central regions A5-A12 of low oxygen concentration, namely less than 21% (weight percent) oxygen concentration. The regions of low oxygen concentration occupy less than 21% of the total flow area of the duct at a plane located at one L/D from the grid 500. As shown in FIG. 7A, at a distance L/D of 1 from the grid 500, there are twelve regions (B1-B12) of high oxygen concentration, namely greater than 23.5% (weight percent) oxygen. The regions of high oxygen concentration occupy less than 22% of the total flow area of the duct at a one L/D from the grid 500. The remainder (i.e., greater than 57%) of the gas has an oxygen concentration within the desired target range of 21% to 23.5% (weight percent) oxygen.

As shown in FIG. 7B, at a distance L/D of 2 from the grid 500, there are two central regions A1-A2 of low oxygen concentration, namely less than 21% (weight percent) oxygen in the flue gas stream. The regions A1 and A2 of low oxygen concentration occupy less than 10% of the total flow area of the duct at a plane located at two L/D's from the grid 500. As shown in FIG. 7B, at a distance L/D of 2 from the grid 500, there are six regions (B1-B6) of high oxygen concentration, namely greater than 23.5% (weight percent) oxygen. The regions B1-B6 of high oxygen concentration occupy less than 1% of the total flow area of the duct at a plane located a two L/D from the grid 500. The remainder (i.e., greater than 89%) of the gas has an oxygen concentration within the desired target range of 21% to 23.5% (weight percent) oxygen.

As illustrated in FIG. 7C, at a distance of three L/D from the grid 500 greater than 99% e.g., 100% of the gas has an oxygen concentration within the desired target range of 21% to 23.5% (weight percent) oxygen.

TABLE 2

| L/D | FIG. | Low Oxygen Concentration Regions (oxygen concentration less than 21%) | | High Oxygen Concentration Regions (oxygen concentration greater than 23.5%) | | Target Range of Oxygen Concentration (oxygen concentration in the range of 21% to 23.5%) | |
|---|---|---|---|---|---|---|---|
| | | Designation | Percent of Duct Flow Area | Designation | Percent of Duct Flow Area | Designation | Percent of Duct Flow Area |
| 1 | 7A | Corners - A1, A2, A3 & A4 Central - A5-A12 | Less than 21% | B1-B12 | Less than 22% | White background area | Remainder, Greater than 57% |
| 2 | 7B | Central - A1-A2 | Less than 10% | B1-B6 | Less than 1% | White background area | Remainder, Greater than 89% |
| 3 | 7C | None | 0% | None | 0% | White background area | Greater than 99%, e.g., 100% |

While the present invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An oxy-combustion system comprising:
   a furnace defining an interior combustion area;
   an oxygen supply system;
   a fuel supply system defining a primary flue gas inlet and a fuel outlet;

at least one flue gas processing system positioned downstream of and in communication with the furnace;

a primary gas system defining a primary flue gas outlet, the primary gas system being in communication with the at least one flue gas processing system and the primary flue gas outlet being in fluid communication with the fuel inlet;

a secondary gas system defining a secondary flue gas outlet, the secondary gas system being in communication with the at least one flue gas processing system and the secondary flue gas outlet being in communication with the furnace;

at least one oxygen discharge line being in communication with at least one of the primary gas system and the secondary gas system; and a grid positioned in a duct of at least one of the primary gas system and the secondary gas system, the grid comprising:

a plurality of lances arranged in a first plane and positioned transverse to a flow direction of a flue gas outside of the lances and within a predetermined flow area;

each of the plurality of lances having at least one oxygen inlet and a plurality of outlet nozzles, the oxygen inlet being in communication with the oxygen supply system; and at least one of the outlet nozzles being directed generally in the flow direction of the of flue gas outside of the lances, and configured to discharge oxygen therefrom;

wherein the plurality of lances includes a set of upper lances extending downwardly and a set of lower lances extending upwardly in the duct; and wherein each of the upper lances vertically align with a respective lower lance, and further comprising at least one sleeve moveable positioned between at least one of the upper lance and lower lance.

2. The oxy-combustion system of claim 1, wherein the primary gas system is in communication with at least one of the furnace, an oxidant preheater, a particulate removal system, a sulfur removal system, a flue gas cooler and a carbon dioxide removal system.

3. The oxy-combustion system of claim 1, wherein the secondary gas system is in communication with at least one of an oxidant preheater, a particulate removal system, a sulfur removal system, a flue gas cooler and a carbon dioxide removal system.

4. The oxy-combustion system of claim 1, further comprising an oxidant preheater in communication with the primary gas system and the secondary gas system, wherein the grid is positioned at least one of upstream of the oxidant preheater and downstream of the oxidant preheater.

5. The oxy-combustion system of claim 1, further comprising an oxidant preheater in communication with the primary gas system and the secondary gas system, wherein the grid is positioned downstream of the oxidant preheater.

6. The oxy-combustion system of claim 1, wherein the first plane is positioned substantially perpendicular to the direction of the flue gas flowing outside of the lances.

7. The oxy-combustion system of claim 1, wherein the plurality of lances extend vertically in the duct.

8. The oxy-combustion system of claim 1, wherein the plurality of lances extend horizontally in the duct.

9. The oxy-combustion system of claim 1, further comprising at least one flow control device in communication with at least one of the plurality of lances.

10. The oxy-combustion system of claim 9, further comprising a control system in communication with the at least one control device for controlling flow of the oxygen into the at least one of the plurality of lances.

11. The oxy-combustion system of claim 10, wherein the at least one control devices is a valve.

12. The oxy-combustion system of claim 1 wherein at least one of the plurality of lances has at least one of the nozzles positioned at an angle of about 30 to about 60 degrees, relative to the direction of the flue gas flowing outside of the lances.

13. The oxy-combustion system of claim 1, wherein at least one of the plurality of lances has at least one of the nozzles positioned at an angle of about 12.5 to about 32.5 degrees, relative to the direction of the flue gas flowing outside of the lances.

* * * * *